L. Y. WILLIAMS.
DUST GUARD.
APPLICATION FILED OCT. 9, 1913.
1,115,638. Patented Nov. 3, 1914.
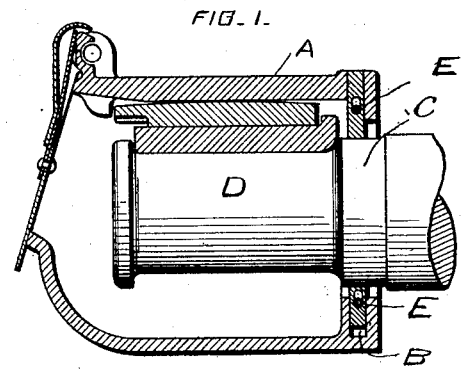
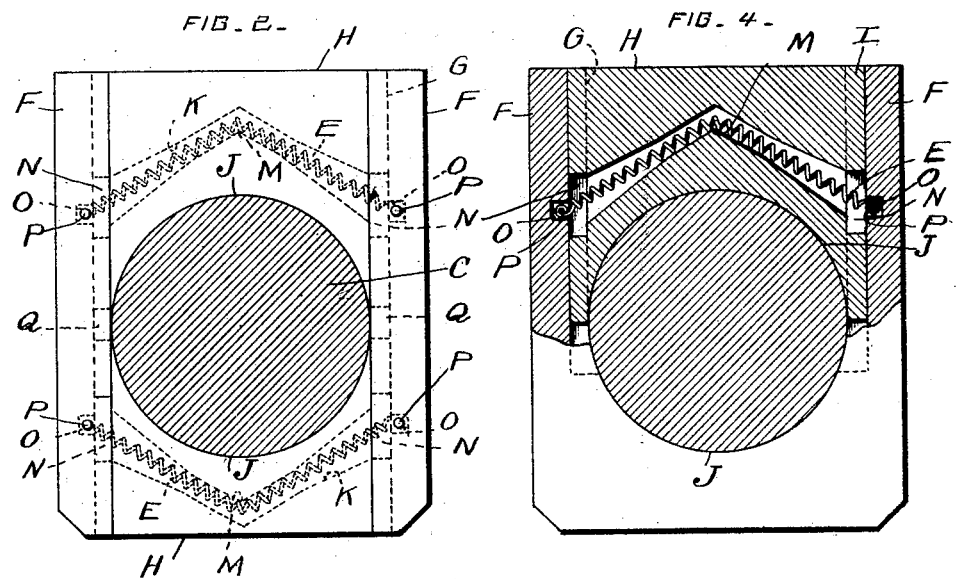
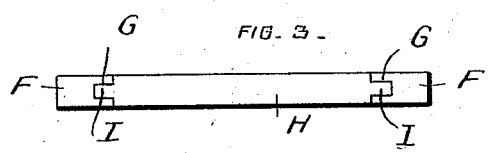
Witnesses
Inventor
L. Y. Williams,
By F. E. Stebbins
Attorney

UNITED STATES PATENT OFFICE.

LACEY Y. WILLIAMS, OF TOLEDO, OHIO.

DUST-GUARD.

1,115,638.   Specification of Letters Patent.   Patented Nov. 3, 1914.

Application filed October 9, 1913. Serial No. 794,291.

*To all whom it may concern:*

Be it known that I, LACEY Y. WILLIAMS, a citizen of the United States, residing at Toledo, in the county of Lucas and State of Ohio, have invented certain new and useful Improvements in Dust-Guards, of which the following is a specification.

The object of my invention is the provision of a dust guard for excluding dust and preventing the escape of oil and waste from a car journal box, the guard to be housed in the chamber at the back end of the box and provided with a small helical spring or springs located within a hole or holes in a movable part or parts of the guard where the same will be protected and not be liable to become broken or inoperative, the spring or springs thus being effective at all times in holding the guard in close frictional contact with the bearing.

The invention consists in certain novelties of construction and combinations of parts as herein set forth and claimed.

The accompanying drawing illustrates one main example and one modification of the embodiment of the invention constructed according to the best modes of procedure I have so far devised for the purpose.

Figure 1 is a longitudinal vertical section of a journal box and of my improved dust guard in the chamber engaging a journal which is shown in elevation. Fig. 2 is a plan view in elevation of the guard applied to a journal, the latter being in section. Fig. 3 is a top plan view of the guard. Fig. 4 shows partly in vertical section and partly in elevation a modified embodiment of the invention.

Referring to Fig. 1, the letter A designates a well known type of journal box having a chamber B with my improved dust guard located therein and surrounding and movable parts thereof pressed against the bearing C of the journal D by springs E, E, of relatively high capacity.

The guard shown by Figs. 1, 2 and 3 comprises four main parts, to-wit: two side pieces F, F, having grooves G, G; and two movable end pieces H, H, each having tongues I, I, fitting the grooves G, G, a curved edge J to fit the journal and a peculiarly shaped hole K within which is located a strong helical spring E relatively of high capacity. The hole for the spring is made by boring two holes in the body of an end piece at angles to each other till they meet and then enlarging the holes adjacent to the edges of the end piece so they will be of an elliptical shape in cross section and so a bearing M will be formed for the central part of the spring to bear against, the parts of the spring each side of the bearing being substantially under normal conditions out of frictional contact with the material of the end piece.

The tongues I, I, of the end pieces are cut away at N and small recesses O made in the side pieces to receive the hooked or coiled ends of the springs where they are fastened or anchored by nails or pins P passing through the body of the side pieces and the hooked or coiled ends of the springs.

The springs are illustrated as under tension and forcing each end piece into firm and close contact with the dust guard bearing of the axle back of the journal. As the curved edges of the end pieces wear away said end pieces approach each other and they can wear for a long period of time until they travel the distance indicated by the open spaces Q, Q, at the sides of the journal.

The modified form of construction differs from the first example only in making the side pieces and one end piece H integral or rigidly united. The movable end piece H is like the end piece in the main example and the curved edges J are forced against the bearing through the contractile action of the single helical spring E, as will be readily understood by those skilled in the art.

It will be observed that the springs are located where they will not be broken or be rendered inoperative by dirt, and that their entire energy is available in forcing the edges of the end pieces against the bearing.

What I claim is:

1. A dust guard having side pieces, and end pieces each with a curved edge to fit a circular bearing; one end piece having a hole through the body thereof extending from side to side and a helical spring located within said hole and the opposite ends thereof anchored to opposite side pieces; the said end piece being movable relative to the side pieces and guided by tongues and grooves formed at the edges of the side pieces and the end piece.

2. A dust guard having side pieces, and end pieces each with a curved edge to fit a circular bearing; one end piece having a hole through the body thereof from side to side, the parts of the hole each side of the center being angularly disposed to each other so as to provide a bearing at M, and the opposite ends of the spring anchored to opposite side pieces, means being provided for guiding the said end piece in its movements.

3. A dust guard having side pieces, and end pieces each with a curved edge to fit a circular bearing; one end piece having a hole through the body thereof from side to side, the parts of the hole each side of the center being angularly disposed to each other and the openings at the sides of the end piece enlarged and a helical spring located within said hole with the opposite ends thereof anchored to opposite side pieces.

4. A dust guard having side pieces, and end pieces, one end piece being movable and having a hole through the body from side to side, a helical spring within the hole and its ends anchored to opposite side pieces, the hole being enlarged at its open ends; the movable end and the side pieces being interlocked by tongues and grooves and the tongues cut away at N to receive the ends of the spring.

5. A dust guard having separate side pieces, and end pieces each with a curved edge to fit a circular bearing; each end piece having a hole through the body thereof from side to side, and a separate helical spring located in each hole and the ends thereof anchored to opposite side pieces, both of the end pieces being movable relative to the side pieces.

6. A dust guard comprised of two side pieces and two perforated end pieces loosely united by tongues and grooves, and two helical springs located within the perforations of the end pieces and the ends of the springs anchored to the side pieces.

In testimony whereof I affix my signature in presence of two witnesses.

LACEY Y. WILLIAMS.

Witnesses:
ANNETTA B. WYLIE,
JNO. S. ALLAM.

---

Copies of this patent may be obtained for five cents each, by addressing the "Commissioner of Patents Washington, D. C."